United States Patent [19]

Fujita et al.

[11] 4,371,922
[45] Feb. 1, 1983

[54] PROCESS STEPPING SEQUENTIAL CONTROLLER

[75] Inventors: Teizo Fujita, Ibarakishi; Hidetaka Dohmoto, Suitashi; Shigeru Toyoda, Ujishi, all of Japan

[73] Assignee: Izumi Denki Corporation, Osaka, Japan

[21] Appl. No.: 177,355

[22] Filed: Aug. 11, 1980

[30] Foreign Application Priority Data

Aug. 21, 1979 [JP] Japan ............................. 54-106872

[51] Int. Cl.[3] .......................... G06F 15/46; G06F 9/00
[52] U.S. Cl. ................... 364/144; 364/146; 364/900
[58] Field of Search ........ 364/104, 107, 200 MS File, 364/900 MS File, 120, 140–147, 188, 189

[56] References Cited

U.S. PATENT DOCUMENTS

| | | | |
|---|---|---|---|
| 3,975,622 | 8/1976 | Horn et al. | 364/104 |
| 4,038,533 | 7/1977 | Dummermuth et al. | 364/104 |
| 4,092,730 | 5/1978 | Burkett et al. | 364/900 |
| 4,180,862 | 12/1979 | Seipp | 364/900 |
| 4,247,901 | 1/1981 | Martin et al. | 364/104 X |

Primary Examiner—Joseph F. Ruggiero
Attorney, Agent, or Firm—Koda and Androlia

[57] ABSTRACT

A process stepping sequential controller includes a random access memory for a memory for programming and a process stepping counter, whereby a program from a console is written thereto or altered therein, and also includes a display unit for monitoring the input from the console and the running program, the random access memory including program areas each adapted to store instruction codes, codes representing the stepping condition of the program, and output setting codes under which control is commanded at its step.

6 Claims, 15 Drawing Figures

FIG. 4

(A) | TIM | MIN. | SEC. | 0.1 SEC. | OUTPUT |

(B) | CNT | INPUT | $10^3 \cdot 10^2$ | $10^1 \cdot 10^0$ | OUTPUT |

(C) | AND OR | INPUT | INPUT | INPUT | OUTPUT |

(D) | JMP | INPUT | STEP | | |

(E) | RPT | TIMES | STEP | | |

(F) | END | STEP | | | |

(G) | RET | | | | |

(H) | NOP | | | | |

(I) | NOT | INPUT | INPUT | INPUT | |

(J)
| TIM | MIN. | SEC. | 0.1 SEC. | OUTPUT |
|---|---|---|---|---|
| 2-AND | INPUT-a | INPUT-b | INPUT-c | |

(K)
| AND | INPUT-a | INPUT-b | INPUT-c | OUTPUT |
|---|---|---|---|---|
| 2-AND | INPUT-d | INPUT-e | INPUT-f | |

(L)
| CNT | INPUT-a | $10^3 \cdot 10^2$ | $10^1 \cdot 10^0$ | OUTPUT |
|---|---|---|---|---|
| 2-AND | INPUT-b | INPUT-c | INPUT-d | |

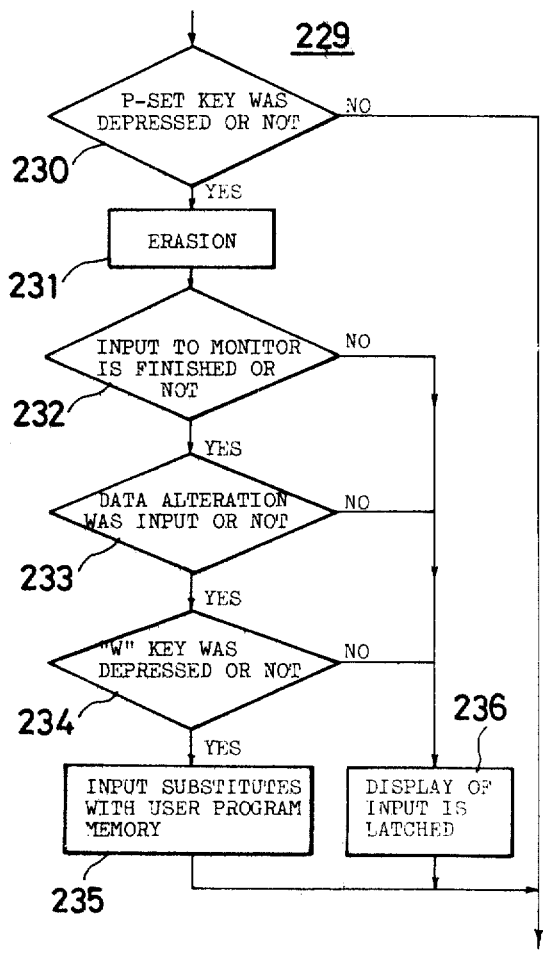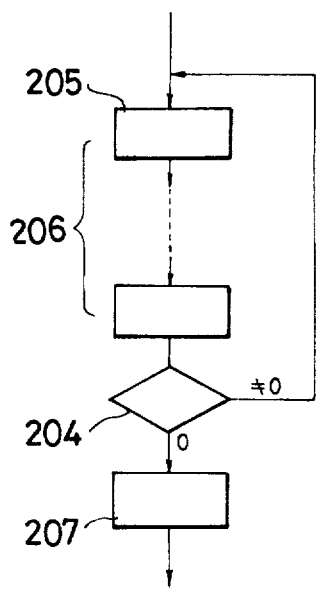

PROCESS STEPPING SEQUENTIAL CONTROLLER

BACKGROUND OF THE INVENTION

This invention relates to a process stepping sequential controller.

The known process stepping sequential controller includes a stepping switch adapted to step at every satisfaction of an input condition, and a diode matrix which rigidly determines a desired output to an address selected by the stepping switch. However, under such structures there is a limitation in the number of steps to be dealt with and in the range of a stepping condition to be set. This is a fatal defect to the achievement of a high performance sequential controller.

On one hand, however, because of the recent remarkable progress of a semiconductor producing technology a light, versatile small-size microprocessor has become accessible, and there is a proposal for such microprocessors to apply to a sequential controller. Nevertheless, there has been hitherto no sequential controller that has successfully incorporated a microprocessor.

The present invention is based upon the research and study of the versatility of a sequential controller and the characteristic of a microprocessor currently available, and has embodied a unique process stepping sequential controller which has many advantages, such as a reduced production cost, a compact handy size, and an increased versatility.

An object of the present invention is to provide an improved process stepping sequential controller which allows the programmed instructions to proceed to a subsequent step in response to every satisfaction of an stepping condition previously set.

Another object of the present invention is to provide an improved process stepping sequential controller which allows a combination of plural instructions, such as two logic instructions as "AND", "OR", or a logic instruction and a time instruction, or a logic instruction and a counted value, or a combination of one of the "AND", "OR", "TIME" or "COUNTS" with either of "2-AND" or "2-OR".

A further object of the present invention is to provide an improved process stepping sequential controller including a monitor display whereby the program is monitored so as to alter the program where required.

A still further object of the present invention is to provide an improved process stepping sequential controller including a display unit adapted to display a stepping condition set at a console from step to step.

A still further object of the present invention is to provide an improved process stepping sequential controller whose housing is dividable into two hinged sections, each section having working panels on its front, thereby enabling the controller to be installed with the working panels in opposite directions or in the same direction one above and the other below.

SUMMARY OF THE INVENTION

According to one advantageous aspect of the present invention, a process stepping sequential controller includes a random access memory for a memory for programming and a process stepping counter, whereby a program from a console is written thereto or altered therein, and also includes a display unit for monitoring the input from the console and the running program, the random access memory including program areas each adapted to store instruction codes, codes representing the stepping condition of the program, and output setting codes under which control is commanded at its step.

BRIEF DESCRIPTION OF THE DRAWING

FIG. 4 is a schematic illustration of the content of the instruction word in FIG. 3;

FIG. 5 is a program flowchart of the "JMP" instruction in FIG. 4(D);

FIGS. 8 and 9 are program flowcharts of the system program in FIG. 1;

DETAILED DESCRIPTION OF A PREFERRED EMBODIMENT

Figure 1:
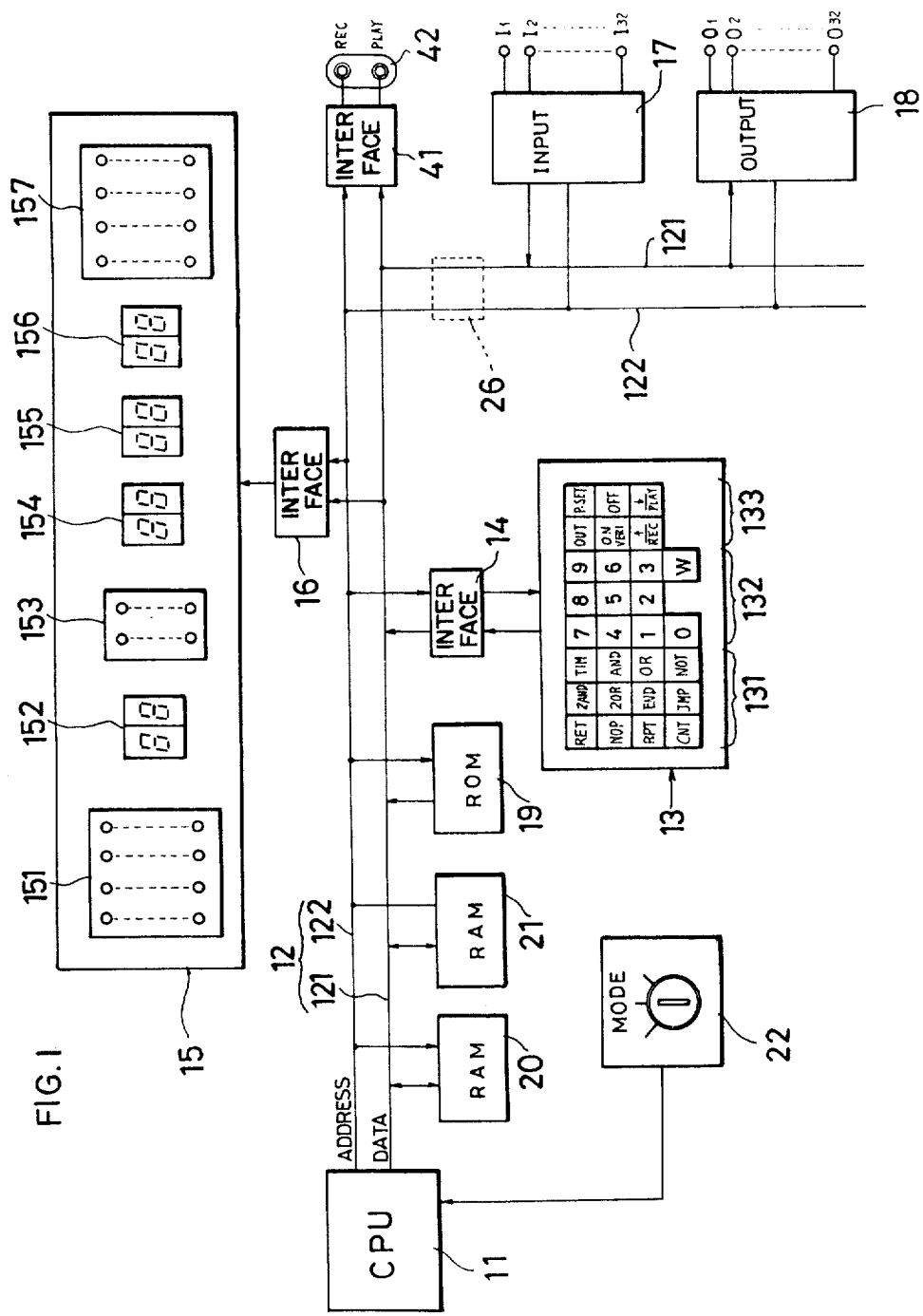
FIG. 1 is a block diagram of the whole system in a process stepping sequential controller in accordance with the invention.

The sequence controller has a microprocessor 11 and a bus line 12 connected to the microprocessor, which bus line includes various modular circuits and memories.

A set of input keys 13 is to set and modify programs, or to operate the controller, and input signals are transmitted to a data bus 121 through a key input interface 14. The set of input keys 13 includes a group of instruction keys 131 for specifying the type of operation to be performed, a group of numeric keys 132 for inputting numerical data, and a group of function keys 133 for specifying the other operations to be performed.

The instruction keys 131 include a "TIM" key for setting time, a "CNT" key for setting numerical data, an "AND" key and a "2-AND" key each for setting an AND logic, an "OR" key and a "2-OR" key each for setting an OR logic, a "JMP" key for setting a program jump, a "RPT" key for setting the iteration of program, an "END" key for setting the termination of program, a "RET" key for setting the return of a program to the former step prior to an interruption, a "NOP" key for setting the non-operation of program, and a "NOT" key for setting a NOT logic.

The function keys 133 include a "W" key for instructing to transmit to a data bus 121 the code signals temporarily memorized in an interface for key input 121, an "OUT" key for setting the output, a "PSET" key for initiating the programming or calling for step number desired for monitor display, an "ON/VERI" key for operating on a series of numbers in output setting, an "OFF" key for erasing the effect of a previously set output, an "UP" key for modifying the number of a set output to a larger number, and a "DOWN" key for modifying the number of a set output to a smaller number, wherein when not under the programming mode, the UP key and the DOWN key can function as a "PLAY" key and a "REW" key, respectively, for switching on the PLAY and the REVIEW of a magnetic recording tape of cassette type when the same is connected to the system.

A display unit 15 includes an input indicator 151 having light emission diodes (LED) arranged correspondingly to each input terminal $1_1$ to $1_{32}$, a step indicator 152 for indicating the step number of program in 2 digits, an operation indicator 153 having LEDs arranged correspondingly to each type of operations, a set of numeral indicators SET-A 154, SET-B 155 and SET-C 156 each for representing the content of stepping condition in 2 digits, and an output indicator 157 having LEDs arranged correspondingly to each output terminal $0_1$ to $0_{32}$. These indicators are driven and controlled by an interface for display 16 which is supplied with data from the data bus 121 in response to controlled signals through an address bus 122.

Preferably the LEDs in the input indicator 151 are in green, and those in the output indicator 157 are in red.

The 32 input terminals $1_1$ to $1_{32}$ are connected to an input module 17 in which a data selector is provided to scan and select signals. The selected signals are applied to the data bus 121 through which they are supplied to a central processing unit (CPU) 11. The data selector is controlled by the address bus 122.

The output signals transmitted from the sequential controller to a controlled system are applied to the output terminals $0_1$ to $0_{32}$ through a module for output 18, which includes a latch circuit having a 32 bit-capacity corresponding to each output terminal to hold the output until the step is changed into the next step on the satisfaction of the stepping condition. The module for output 18 is controlled by the address bus 122, and is driven in response to signals through the data bus 121.

An interface for a tape deck 41 is connected to the bus line 12, which interface is designed for connection of a magnetic recording tape of cassette type. For this purpose, the console includes a connector 42 having an REC terminal and a PLAY terminal. The interface for a tape deck 41 includes a converter of digital signal/audio signal, which generates audio signals having a frequency $f_1$ corresponding to the digital signal "1" as well as a frequency $f_2$ corresponding to the digital signal "0". As the address bus 122 instructs, a digital signal from the data bus 121 is converted into an audio signal having a frequency $f_1$ or $f_2$, or an audio signal having a frequency $f_1$ or $f_2$ is converted into a digital signal which is input to the data bus 121.

Figure 2:
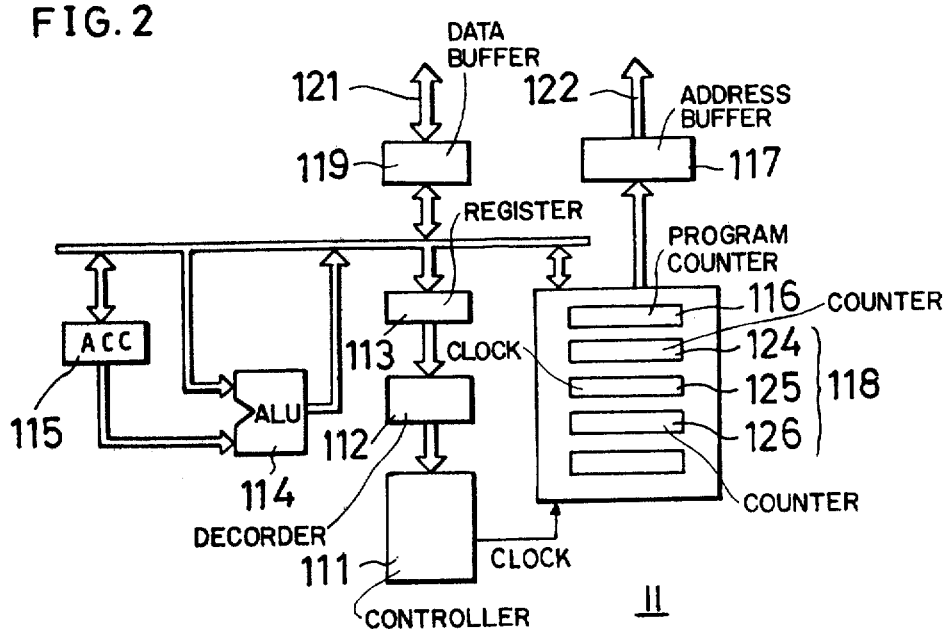
FIG. 2 is a block diagram of the central processing unit in the controller in FIG. 1.

Referring to FIG. 2 the CPU 11 includes a timing and control section 111 including a clock generator; an instruction decoder 112; an instruction register 113; an arithmetic logic unit 114; an accumulator 115; a program counter 116 for sending address signals to the address bus 122; an address buffer 117; a group of various registers 118, and a data buffer 119 for sending data to the data bus 121, wherein the group of various registers 118 includes a process step counter for prescribing the program steps of the sequential controller, a counter for a clock 125 and a signal counter 24 126 for counting input signals. The data bus 121 has 8 lines, and the address bus 122 has 16 lines. For the CPU a microprocessor in commerce can be employed. For example, Type 8085 by INTEL Inc., and Type 6800 by MOTOROLA Inc. can be employed.

The memory rigidly stores various routine programs to be performed in association with the CPU 1, and it includes a system program 19, a user program 20 which can be written from a console key, and a work area 21 in which the items of program being performed are picked up from the user program for temporary memory on which basis the CPU 11 controls the output. For the system program 19 a read only memory is employed, and for the user program 20 and the work area 21 random access memories are employed.

Figure 3:
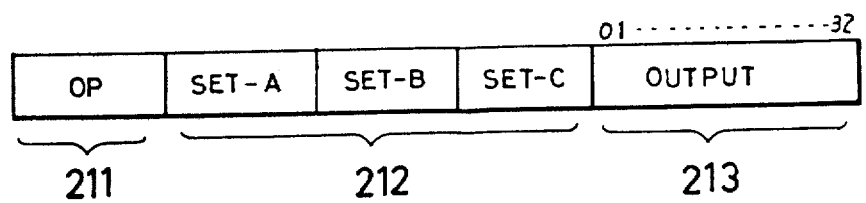
FIG. 3 is a schematic illustration of a format of an instruction word.

FIG. 3 shows the structure of an instruction word for a program to be stored in the user program 20. The instruction word is formed with an 8 bit instruction code 211 indicating the type of operation, a $3 \times 8$ bit code 212 consisting of SET-A, SET-B and SET-C each representing a stepping condition, and a 32 bit output setting code 213 which indicates whether a control instruction with respect to the 32 output terminals is "ON" or "OFF". The contents of the SET-A, SET-B and SET-C are specified in accordance with the types of operation, but they will totally or partly become useless, depending upon the type of operation. Accordingly, when 8 bit memory is used, the number of needed address varies with the type of operation.

In the case of "TIM" instruction to set time, it is set such that the SET-A is for "minute", the SET-B is for "second" and the SET-C is for 1/10 sec, as shown in FIG. 4(A). In this way, any time from 0 to 99 minutes 59 sec. 9 can be arbitrarily set.

In the case of "CNT" instruction to set a counted value, an input terminal number is set at the SET-A, and a counted value is set in 4 digits from the SET-B to the SET-C, as shown in FIG. 4(B). In this way, 9999 instructions at maximum can be set.

In the case of "AND" instruction of logical operation, as shown in FIG. 4(C) each input terminal number is set at the SET-A, SET-B and SET-C, such that a stepping condition is satisfied when the signal "1" arrives at each input terminal. The "2-AND" instruction is used for the second step in the combinational instructions referred to below. Likewise, the input numbers are set at each area, as shown in FIG. 4(C).

In the case of "OR" instruction of logical operation, each input terminal number is set at the SET-A, SET-B and SET-C, such that a stepping condition is satisfied when the signal "1" arrives at any of the input terminals. The "2-OR" instruction is likewise used for the second step in the combinational instruction.

In the case of "JMP" instruction, as shown in FIG. 4(D) it is arranged that a stepping condition is satisfied when the input terminal number set at the SET-A becomes the signal "1", and then jumps at the step set at the SET-B. In this case, if the SET-A is set to "00" an unconditional jump will be achieved to the step set at the SET-B. For this instruction the SET-C and the output setting area are not used.

In the case of "RPT" instruction, as shown in FIG. 4(E) a required cycle of iteration is initially set at the SET-A, and the number of subsequent steps expected to jump during the iteration is set at the SET-B. During the performance the items of the SET-A is subtracted by −1 at each cycle under the control of the CPU 11. As shown in FIG. 5, the initially set step 204 returns to the step 205 set at the SET-B, and the items 206 of the program specified between the two steps are iterated until the specified cycles are finished. When the desired cycles of iteration are finished, the process proceeds to a subsequent step 207. For this instruction, the SET-C and the output setting area are not used.

In the case of "END" to indicate the completion of a program, as shown in FIG. 4(F) the step is immediately jumped at the step specified in SET-A from that specifying the "END". Particularly, when the step set at the SET-A is "0" or "1", the program repeatedly starts. For this instruction, the SET-B, the SET-C, and the output setting area are not used.

In the case of "RET" instruction to instruct "Return", the step is returned to the step which was suspended due to an external interruption. As shown in FIG. 4(G) the SET-A, SET-B and SET-C and the output setting area are not used.

In the case of "NOP" instruction to instruct "NON-OPERATION", no step is performed, and the process immediately proceeds to the subsequent step. This will be of advantage when any step has become useless because of an alteration of program. As shown in FIG. 4(H) the SET-A, SET-B, SET-C and the output setting area are not used.

In the case of "NOT" instruction, this is not singly used, but is used in association with other instruction on an input to "AND", "OR", "CNT" or "JMP", wherein the instruction is used to modify the input signal; that is, as shown in FIG. 4(I) an input "1" or "0" at the input terminal number specified at the SET-A, SET-B and SET-C repeatedly undergoes logical operations.

Under the present invention a combinational instruction of 2 steps can be effectively specified and executed.

Figure 6:
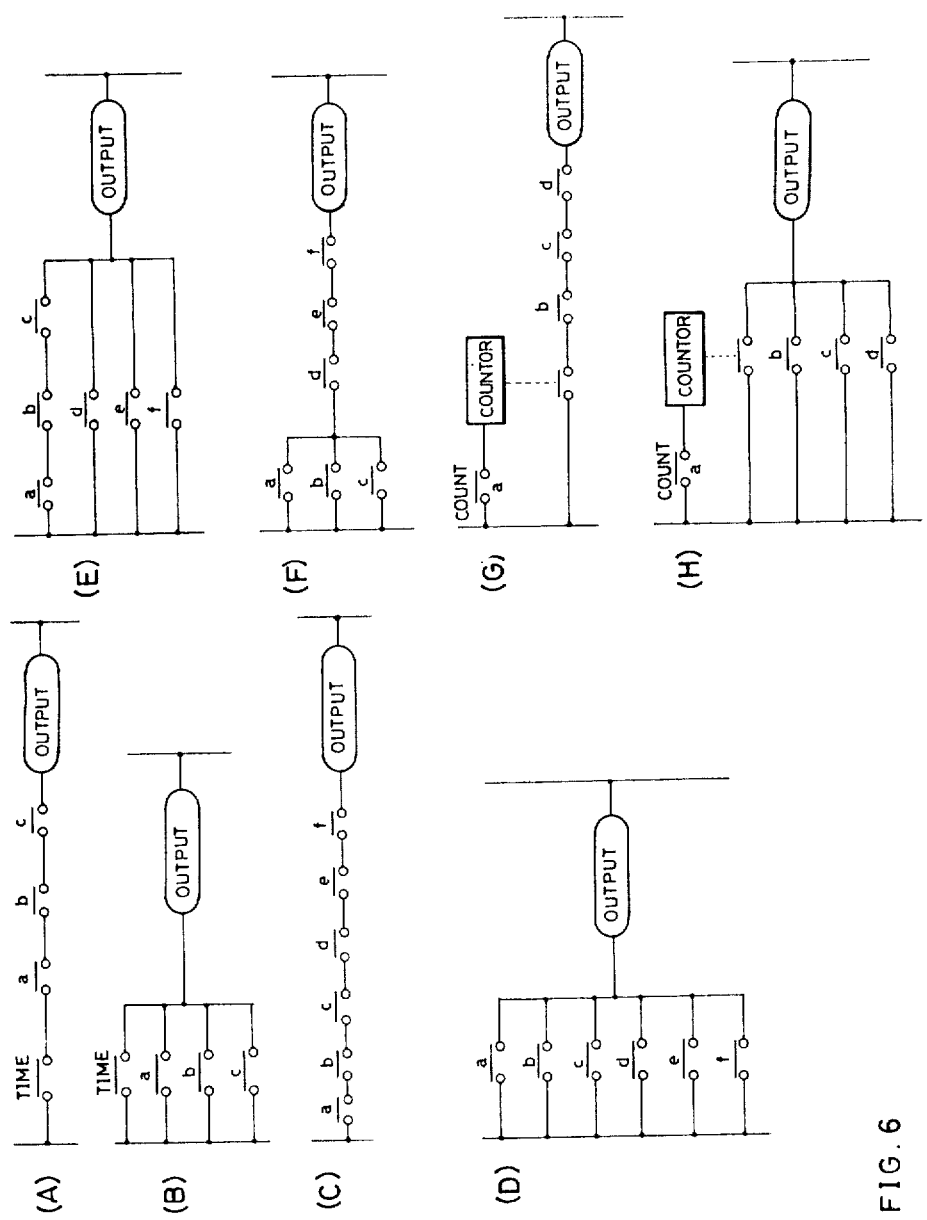
FIG. 6 is a logic circuit diagram of one combinational instruction.

In FIG. 6(A), when the AND logic of (a·b·c) and a time condition are jointly satisfied, a desired output is generated to enable the step to proceed to a subsequent program. In order to achieve this arrangement, a combination of "TIM" and "2-AND" instructions are set, as shown in FIG. 4(J). Likewise, in FIG. 6(B), when either the OR logic of (a+b+c) or a time condition is satisfied, a desired output is generated to enable the program to proceed to a subsequent program. In this case, a combination of "TIM" and "2-OR" instructions is set.

In FIG. 6(C), when the AND logic of 4, 5 or 6 outputs (up to 6 exceeding 3), for example (a·b·c·d·e·f) is satisfied, the program proceeds to a subsequent step. In this case, a combination of "AND" and "2-AND" instructions is set, as shown in FIG. 4(K). Likewise, in FIG. 6(D) when the OR logic of 4, 5 or 6 inputs (up to 6 exceeding 3), for example, (a·b·c·d·e·f) is satisfied, the program is enabled to proceed to a subsequent program. In this case, a combination of "OR" and "2-OR" instructions is set.

If, as shown in FIG. 6(E), a stepping condition depends upon the satisfaction of a logic [(a b c)+d+e+f], a combination of "AND" and "2-OR" instructions may be set. If it depends upon the satisfaction of a logic [(a+b+C)·d·e·f] as shown in FIG. 6(F), a combination of "OR" and "2-AND" instructions may be set.

In FIG. 6(G), when a counted value at the counter reaches a desired set value, and the inputs (b), (c) and (d) become "1" at the same time, the program proceeds to a subsequent step. In this case, a combination of "CNT" and "2-AND" instructions is set as shown in FIG. 4(L). In FIG. 6(H) either when a counted value at the counter reaches a desired set value, or when any of the inputs (b), (c), and (d) becomes "1", the program proceeds to a subsequent step. For such a case, a combination of "CNT" and "2-OR" instructions is set.

The combinational instructions mentioned above are used in association with either "2-AND" or "2-OR" instruction.

Figure 7:
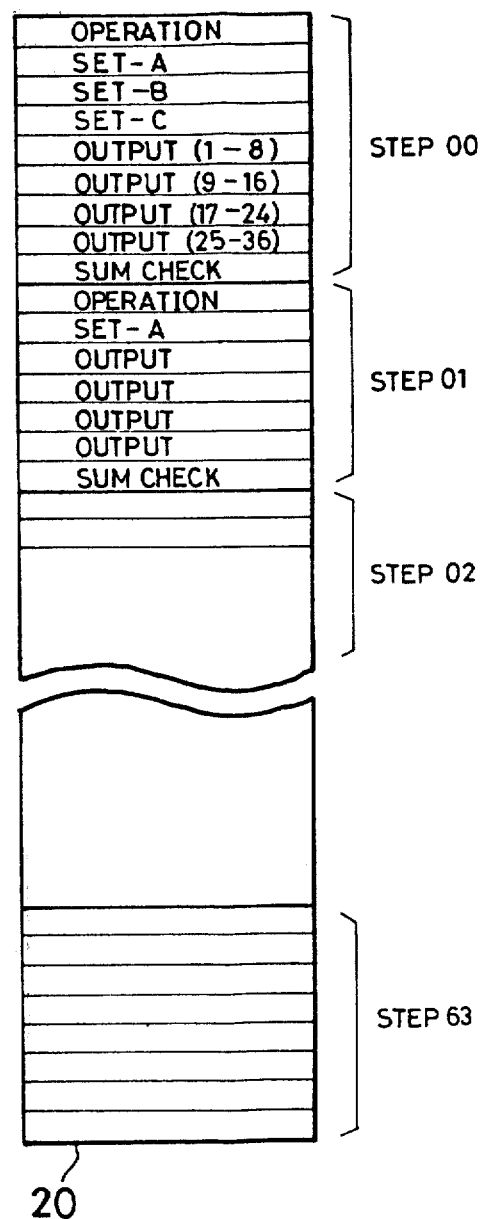
FIG. 7 is a schematic illustration of a format of the user program in FIG. 1.

FIG. 7 shows the address of the user program 20, in which it will be noted that the first step occupies 9 bytes including the operation located at Address 1; the SET-A at Address 2, the SET-B at Address 3 and the SET-C at Address 4, each occupying one byte (8 bits); the outputs totally occupying 4 bytes from Address 5 to Address 8; and the sum check code at Address 9. The second step occupies 7 addresses, deficient of the SET-B and SET-C as compared with the first step.

The work area 21 is to temporarily memory the items of user program to be subsequently performed, and when the step after the next is "2-AND" or "2-OR", the combinational instruction already programmed as mentioned above and the step now programmed are jointly transmitted to the work area 21.

Under the present invention it is possible to arbitrarily switch from mode to mode, wherein the modes include a program mode in which a program is set; a lock mode in which the console key is maintained inoperative during the performance of programmed control; and a monitor mode in which the program is monitored. In FIG. 1 the reference numeral 22 designates a selecting switch whose status is input to the CPU 11.

Figure 8:
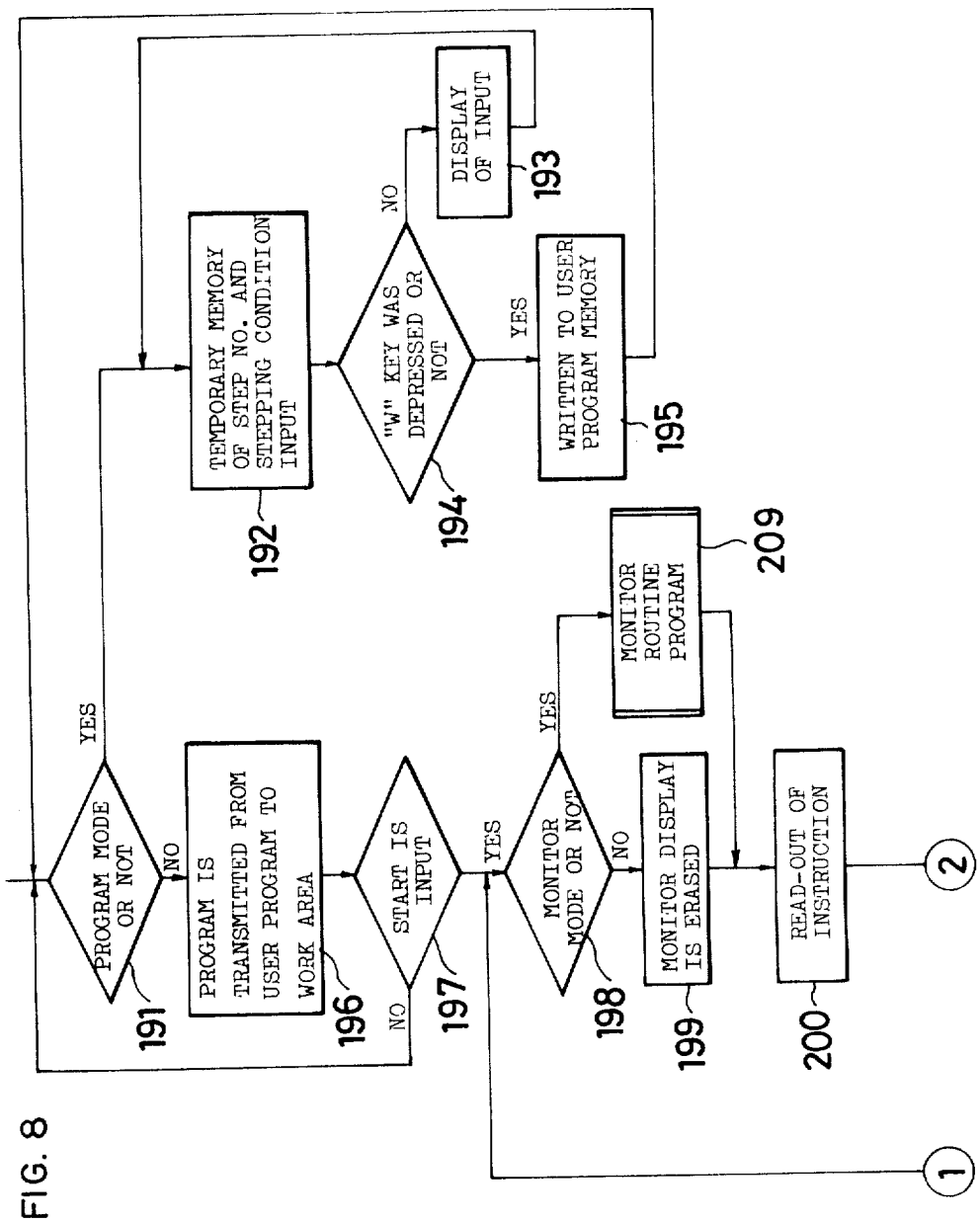
Figure 8:
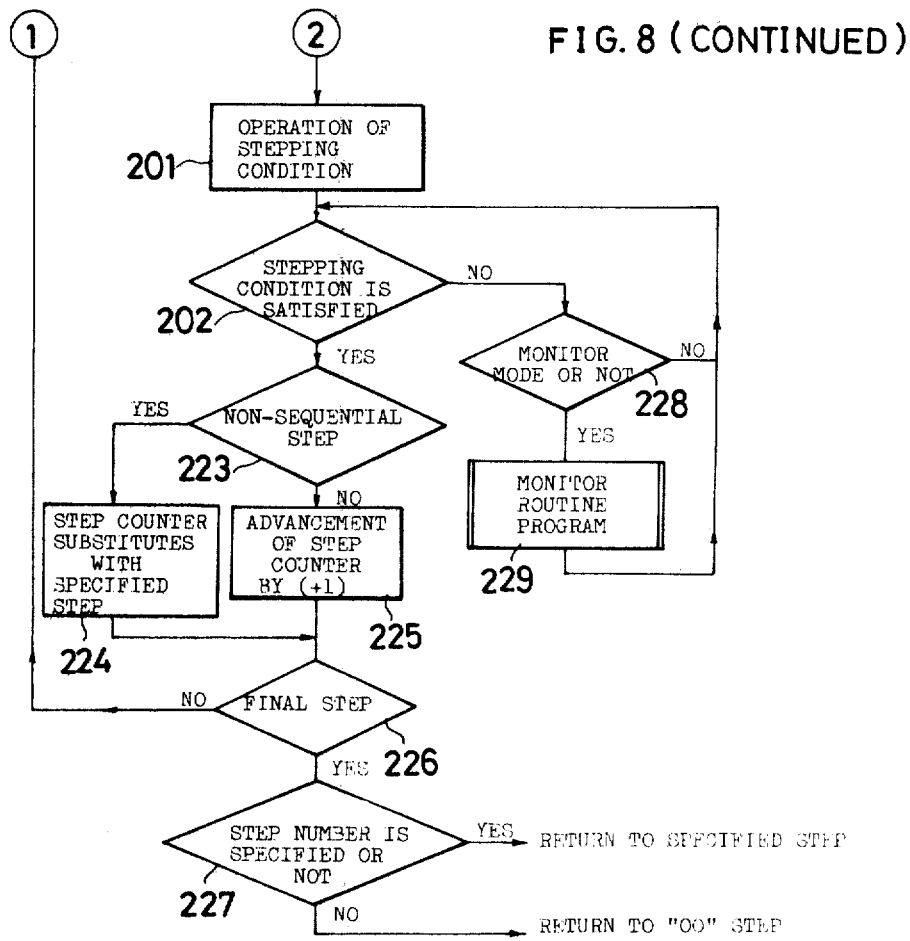

Referring to FIG. 8, a system program 19 includes a decision step 191 in which the mode is examined to find its type. When it found a program mode, it proceeds to a step 192 in which a desired program is made by a key operation, whose results are ascertained through the display 15. If the results are found as desired, a key (W) 194 is depressed, thereby enabling the step to proceed to a step 195 at which the program temporarily memoried in the interface for input 14 is written to the user program 20. This operation is iterated until the user program is satisfied from step to step.

If the lock mode is selected at 191, the step proceeds to a step 196 in which a step to be subsequently performed is shifted from the user program area 20 to the work area 21 to be stored therein. At this stage, if a start input is applied at a step 197, a sequence control program is initiated, and in the case of the lock mode, the step proceeds to steps 198, 199 and 200, respectively. At the step 200 the instruction shifted to the work area 21 is decoded, and at a step 201 the operation is executed in accordance with a stepping condition related to the instruction. Until the stepping condition is satisfied, a decision step 202 is held in "NO" loop. The step 199 is effective only when the monitor mode is switched to the lock mode.

Under the satisfied stepping condition, and if the instruction is a non-sequential step as "JMP", "RET" or "RPT", the step proceeds from a step 223 to a step 224 in which it is substituted by a step number whose count is specified, and then it jumps at that step. If the instruction is a sequential step as "AND" or "OR", the step proceeds from a step 223 to step 225 by (+1). This program is iterated until the step becomes final. In a step 226 the END code is detected, by which the step is judged whether or not it is final. If it is found as final, it returns through a step 227 either to a specified step or the "00" step depending upon whether or not the step number is specified.

When the monitor mode is selected, the step enters into monitor routine programs 209 and 229 which are provided in place in the system. It is not always necessary to provide plural monitor routine programs, but a single one is sufficient. The location can be any place.

In FIG. 9 a flowchart of the monitor routine program 229 is shown. The monitor is operated by switching a "P-SET" key and then inputting a desired step number, and it is stopped by returning a mode selection switch 22 to the lock mode. Before the "P-SET" key is depressed, the decision step 230 is held "NO", and accordingly the instruction passes through the routine without performing any action. As a result, the lock mode is substantially in a continuous operation. When the "P-SET" key is depressed, the display 15 is erased and prepares for a key input. At the same time the interface for display 14 is disconnected from the bus line 12. Until an input in 2 digits for step number is finished, the decision step 232 is held "NO", and accordingly, the instruction passes through the routine immediately after sending it to the interface for display 14. When the input to the monitor is finished the content of the input is monitored by an operator through the display unit 15. If at this stage other step is to be monitored, the "P-SET" key is depressed to repeat the same procedure. If it is desired to modify an item of data, for example, a time element in the "TIM" instruction or a counted value in the "CNT" instruction, the data value to be modified is input after depressing the "TIM" key or the "CNT" key, and the "W" key is finally depressed. In this way the input is shifted to the user program memory 20 through the interface for key input 14 at a step 235, in which the memoried content is rewritten. In this case, if each decision step 232, 233 and 234 is held "NO", the input passes through the routine immediately after being held on the display.

As will be understood from the foregoing, while various operations are being performed by selection of the monitor mode, the operation of a satisfying stepping condition and the finding-out of a satisfaction of a further stepping condition are continued at the steps 201 and 202, respectively. In this case, as the output at the output terminals is latched, the sequential control keeps its normal regular operation. In the monitor mode the operation takes about 20 mS from the start of the program to the decision step 226.

A typical example of the procedure of programming will be explained hereinafter:

In assumption, an "AND" operation is to be performed such that a stepping condition may be satisfied when the input terminal Nos. 01, 02 and 03 become "1" at the step No. 45, and that at this step No. 45 "1" be output only from the terminal Nos. 04 and 05 while "0" may be output from the remaining terminals. In addition, a program is set such that when "1" or "0" is output and when the stepping condition is satisfied, the step advances to the next step No. 46.

After the program mode is selected, the "P-SET" key is depressed. At this stage no display appear on the display unit 15. Subsequently, the digits "45" is input, which is on the step display 152. This indication shows that the step No. 45 is ready for programming. Then the "AND" key is depressed, and "AND" is on the operation display 153. Digits "01", "02" and "03" are input in succession, and "01", "02" and "03" appear on the SET-A, SET-B and SET-C displays 154, 155 and 156. The "OUT" key is depressed to set the output, and digits "04" is input, which is on the output display 157. The "ON/VERI" key is depressed, which will be displayed as "05". After it is examined whether or not instructions have been programmed as desired, the "W" key is depressed, whereby the program is written to the area for the step No. 45 in the user program 20.

While the sequence control is being performed under the lock mode, the display unit 15 shows that portion of program being performed which corresponds to the status of the step counter, and the output signals is held in the latch circuit of the module for output 18.

In this situation, a memoried content of a step, for example, "STEP 12", can be monitored as follows:

The lock mode is switched to the monitor mode by the mode selection switch 22, and then "P-SET" key and "12" key are depressed. The display unit 15 shows the content of the "STEP 12", which will be held until the mode selection switch 22 is returned to the lock mode.

Referring to FIGS. 10 to 13, a housing includes a front section 23 and a back section 24, wherein these sections are jointed by means of hinges 25 and a connecting cable 26 through which they are electrically connected. In the front section 23 a console panel 27 is provided, with the display unit 15, the group of keys 13, the mode selection switch 22, the connector 42 to a magnetic recording tape of cassette type. Inside the console panel 27 the CPU 11 and memories 19, 20 and 21 are housed. The back section 24 has an input terminal panel 30 and an output terminal panel 31 on its back, and houses a module for input 17 and a module for output 18. The connecting cable 26 contains the bus line 26 (FIG. 1) and a source line (not shown).

Figure 11:
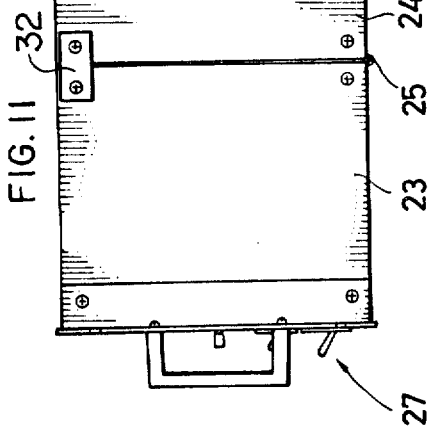
FIGS. 10 and 11 are a front view and a side view, respectively, showing the first mode of use.
Figure 14:
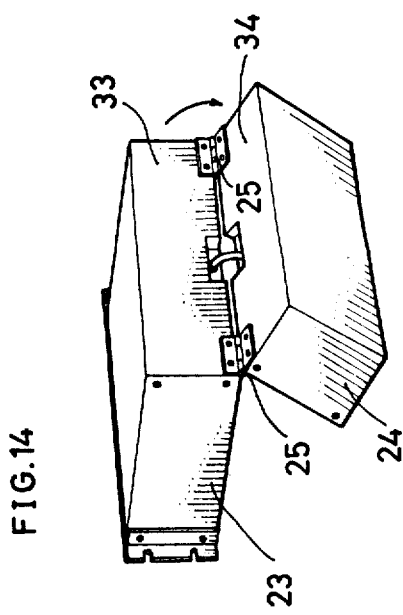
FIG. 14 is a perspective view of the housing wherein the front and back sections are unlocked.
Figure 10:
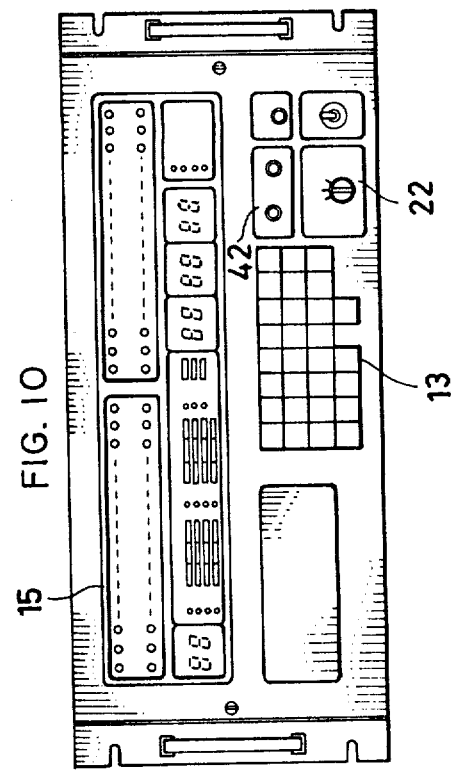
Figure 13:
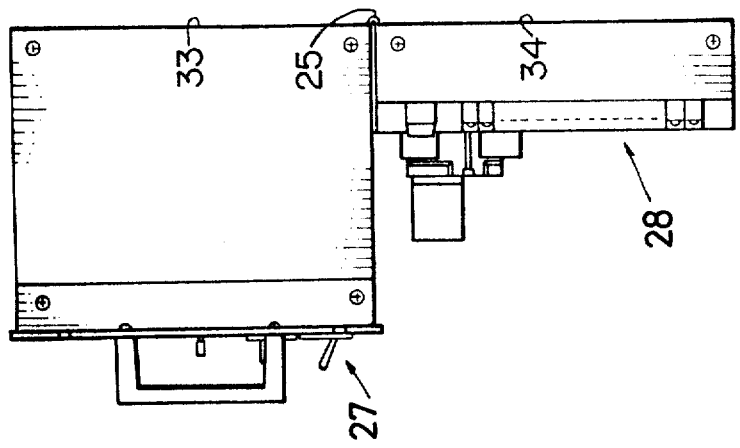
FIGS. 12 and 13 are a front view and a side view, respectively, showing the second mode of use.
Figure 12:
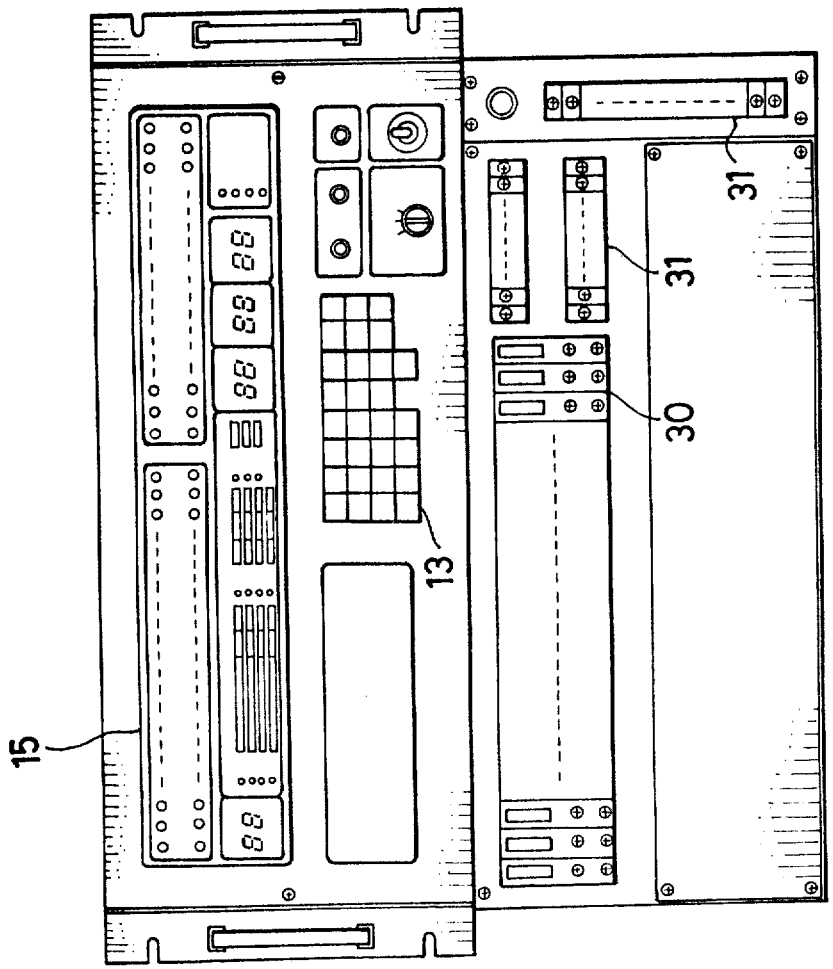

For use, the first mode is shown in FIGS. 10 and 11: in which the front and back sections are jointed such that the console panel 27 faces frontward while the input and output terminal panels 30 and 31 face backward wherein they are locked by means of a lock means 32 located in opposite sides to the hinges 25. The second mode of use is as shown in FIGS. 12 and 13, in which the two section 23 and 24 are unlocked as shown in FIG. 14. Reference numerals 33 and 34 designate the bottoms of the front and back sections 23 and 24, respectively. In the second mode of use the housing is supported on a wall or any other suitable structure with each bottom 33 and 34 of the front and back sections facedly attached to the structure as shown in FIG. 13, wherein the input and output terminal panels 30 and 31 are located below the console panel 27.

Figure 15:
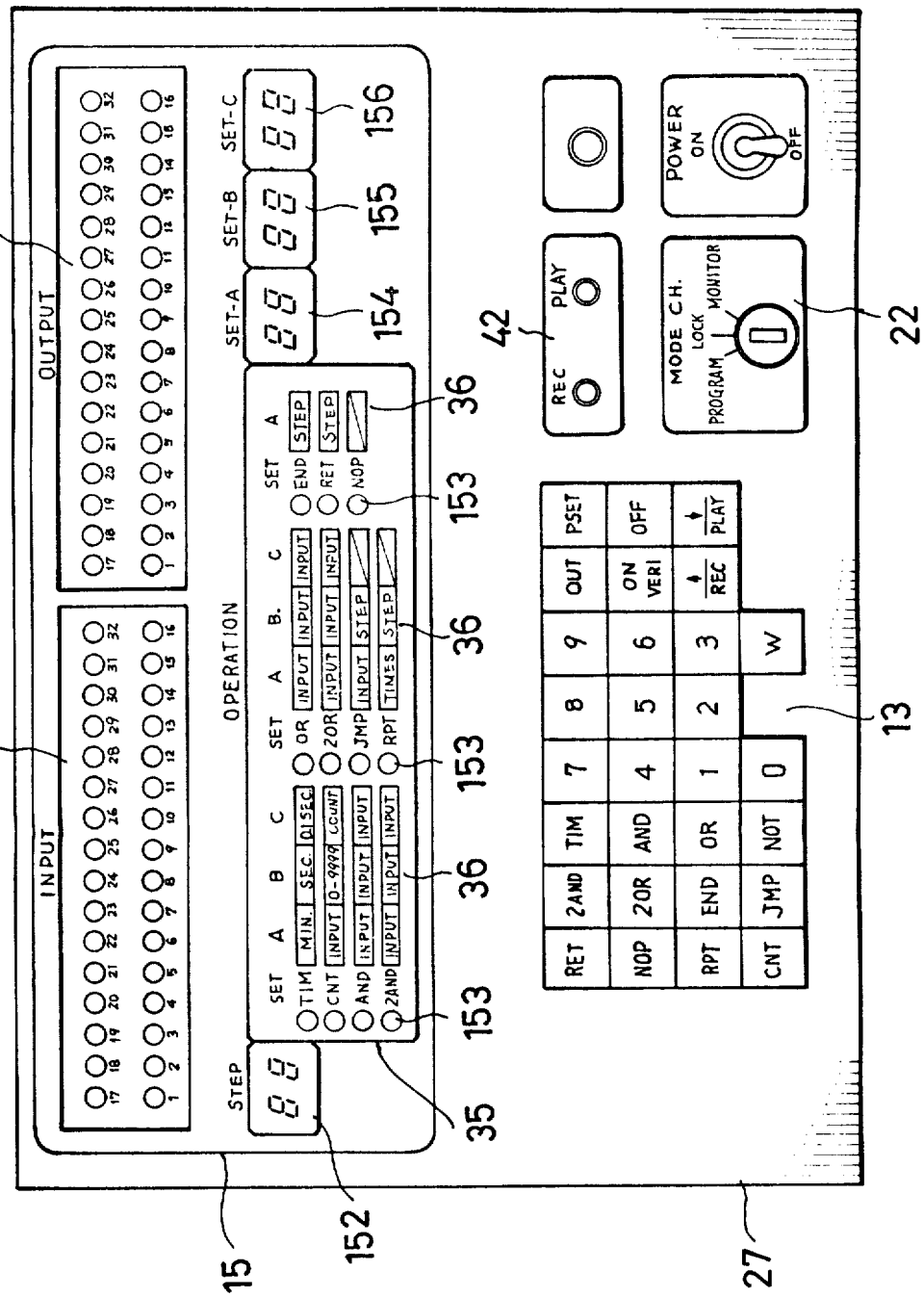
FIG. 15 is a front view on an enlarged scale of a console panel.

In FIG. 15 the front of the console panel 27 is shown by way of example: in the display unit 15 the input and output displays 151 and 157 are located in the upper section; in the central section the instruction displays 35 are located with the step display 152 in its left-handed side and the SET-A, SET-B and SET-C displays 154, 155 and 156 in its right-handed side; and in the lower section the key group 13 and the mode selection switches 22 are located.

In the instruction display 35 the operation displays 153 by LED (light emission diode) and reference listings 36 on each LED for showing the stepping conditions are located. The reference listings are to teach an operator the content of the SET-A, SET-b and SET-C. The operator will recognize through the listings what programming and/or controlling is running.

What is claimed is:

1. A process stepping sequential controller, which comprises:
   a memory for programming which allows random writing thereto and reading out therefrom;
   a process stepping counter for designating step numbers;

an input key for writing a program to said memory for programming, wherein said input key includes instruction keys, numeric keys and function keys;

a display unit for displaying an input from said input key and the items stored in said memory for programming, wherein said items include step number and the data stored for said step numbers;

said memory for programming including memory areas corresponding to each step of said process stepping counter, wherein each step area stores operation codes, codes representing the stepping condition of each program and output setting codes for commanding control in response to the satisfaction of said stepping condition;

said display unit including a representation of the type of said each operation and the content of data previously set with respect to each operation, wherein said representation is made in contrast; and said process stepping counter proceeding to a subsequent specified process in response to the satisfaction of each stepping condition.

2. A process stepping sequential controller as defined in claim 1, wherein said stepping condition of each program is represented by numbers in SET-A, SET-B and SET-C, each of said SET-A, SET-B and SET-C being indicated in plural digits and independently of one another, and wherein said representation in contrast is made by providing three different columns indicating each of said SET-A, SET-B and SET-C.

3. A process stepping sequential controller as defined in claim 1, wherein said types of operation include "AND" instructing an AND operation, "OR" instructing OR operation, "TIM" instructing time, "CNT" instructing counts, "2-AND" and "2-OR", or a combination of one of said "AND", "OR", "TIM" or "CTN" with either of said "2-AND" or said "2-OR".

4. A process stepping sequential controller as defined in claim 1, further comprising a selecting switch for selecting one of three modes including a program mode in which a program is set by said input key, a lock mode in which said set program is maintained to effect control in accordance therewith, and a monitor mode in which the content of said each program is monitored.

5. A process stepping sequential controller as defined in claim 4, wherein throughout said monitor mode the operation of a satisfying stepping condition and the finding-out of a satisfaction of a further stepping condition is continued, with the output at the output terminal being latched.

6. A process stepping sequential controller as defined in any one of the preceding claims 1 to 5, further comprising a housing including a front section and a back section, wherein said two sections are hinged to each other and also electronically connected, one of said two sections including a console board thereon while the other includes an input terminal panel and an output terminal panel thereon such that when said housing is opened for use, said console board and said input and output terminal panels are faced to the operator's side.

* * * * *